(12) United States Patent
Katsuya et al.

(10) Patent No.: US 12,741,400 B2
(45) Date of Patent: Sep. 22, 2026

(54) FIBER-REINFORCED RESIN COMPOSITE BODY, PRODUCTION METHOD THEREFOR, AND NON-WOVEN FABRIC FOR USE IN FIBER-REINFORCED RESIN COMPOSITE BODY

(71) Applicant: KURARAY CO., LTD., Kurashiki (JP)

(72) Inventors: Satoshi Katsuya, Okayama (JP); Yosuke Washitake, Okayama (JP); Ryokei Endo, Chiyoda-ku (JP)

(73) Assignee: KURARAY CO., LTD., Kurashiki (JP)

( * ) Notice: Subject to any disclaimer, the term of this patent is extended or adjusted under 35 U.S.C. 154(b) by 962 days.

(21) Appl. No.: 17/257,697

(22) PCT Filed: Jun. 26, 2019

(86) PCT No.: PCT/JP2019/025418
§ 371 (c)(1),
(2) Date: Jan. 4, 2021

(87) PCT Pub. No.: WO2020/012964
PCT Pub. Date: Jan. 16, 2020

(65) Prior Publication Data

US 2021/0283805 A1 Sep. 16, 2021

(30) Foreign Application Priority Data

Jul. 13, 2018 (JP) ................................ 2018-133420

(51) Int. Cl.
*B29C 70/50* (2006.01)
*B29B 15/10* (2006.01)
(Continued)

(52) U.S. Cl.
CPC ............ *B29B 15/105* (2013.01); *B29C 70/02* (2013.01); *B29C 70/506* (2013.01); *B32B 5/02* (2013.01);
(Continued)

(58) Field of Classification Search
CPC ....... B32B 5/02; B32B 5/12; B32B 2260/046; B32B 2264/0214; B29K 2101/10; B29K 2307/558; D04H 3/009
See application file for complete search history.

(56) References Cited

U.S. PATENT DOCUMENTS

| | | | | |
|---|---|---|---|---|
| 6,027,794 | A | 2/2000 | Ozaki et al. | |
| 2004/0170554 | A1* | 9/2004 | Wadahara | B32B 5/024 423/447.2 |

(Continued)

FOREIGN PATENT DOCUMENTS

| | | | |
|---|---|---|---|
| CN | 1344205 | A | 4/2002 |
| CN | 105339541 | A | 2/2016 |

(Continued)

OTHER PUBLICATIONS

WO9416003 machine translation (Year: 1994).*

(Continued)

*Primary Examiner* — Jenna L Johnson
(74) *Attorney, Agent, or Firm* — Oblon, McClelland, Maier & Neustadt, L.L.P.

(57) ABSTRACT

A fiber-reinforced resin composite body (1) may include: a thermosetting resin (2); a plurality of reinforcing fiber layers (4) stacked in the thermosetting resin (2); and a thermoplastic resin (5) dispersed in a form of particles in the thermosetting resin (2) between the plurality of reinforcing fiber layers (4). The thermosetting resin may be an epoxy resin derived from a bisphenol A-diglycidyl ether skeleton of formula:

(Continued)

The thermoplastic resin may include polyetherimide resin, a polysulfone resin, and/or a polyethersulfone resin.

16 Claims, 3 Drawing Sheets

(51) Int. Cl.

| | |
|---|---|
| ***B29C 70/02*** | (2006.01) |
| ***B32B 5/02*** | (2006.01) |
| ***B32B 5/12*** | (2006.01) |
| ***C08J 5/04*** | (2006.01) |
| *B29K 63/00* | (2006.01) |
| *B29K 79/00* | (2006.01) |
| *B29K 101/10* | (2006.01) |
| *B29K 479/00* | (2006.01) |
| *B29K 481/00* | (2006.01) |
| *B29K 501/12* | (2006.01) |

(52) U.S. Cl.

CPC ................. *B32B 5/12* (2013.01); *C08J 5/046* (2013.01); *B29K 2063/00* (2013.01); *B29K 2079/08* (2013.01); *B29K 2101/10* (2013.01); *B29K 2479/085* (2013.01); *B29K 2481/06* (2013.01); *B29K 2501/12* (2013.01); *B32B 2260/023* (2013.01); *B32B 2264/50* (2020.08); *B32B 2307/558* (2013.01); *C08J 2363/02* (2013.01)

(56) References Cited

U.S. PATENT DOCUMENTS

| | | | | |
|---|---|---|---|---|
| 2005/0197023 | A1 | 9/2005 | Woolstencroft | |
| 2006/0252334 | A1 * | 11/2006 | LoFaro | B32B 7/10 442/361 |
| 2008/0160282 | A1 | 7/2008 | Woolstencroft | |
| 2016/0145782 | A1 | 5/2016 | Sasaki et al. | |
| 2016/0159030 | A1 | 6/2016 | Lo Faro et al. | |

FOREIGN PATENT DOCUMENTS

| | | | | |
|---|---|---|---|---|
| EP | 0 632 087 | A1 | 1/1995 | |
| EP | 3255083 | A1 * | 12/2017 | B29C 70/025 |
| JP | 2003-82117 | A | 3/2003 | |
| JP | 2007-262355 | A | 10/2007 | |
| JP | 2008-540766 | A | 11/2008 | |
| JP | 2009-62473 | A | 3/2009 | |
| JP | 2009-167349 | A | 7/2009 | |
| JP | 2010-95557 | A | 4/2010 | |
| JP | 2012-107160 | A | 6/2012 | |
| WO | WO 94/16003 | A1 | 7/1994 | |
| WO | WO 2018/043324 | A1 | 3/2018 | |
| WO | WO 2019/230837 | A1 | 12/2019 | |

OTHER PUBLICATIONS

Wikipedia.org "Binder (Material)" 2025. https://en.wikipedia.org/wiki/Binder_(material) (Year: 2025).*

Tortora, Phyllis G Fairchild's Dictionary of Textile "Binder Definition". Fairchild Publications, New York. 2003 pp. 54. (Year: 2003).*

Office Action issued Aug. 29, 2022, in corresponding European Patent Application No. 19834128.1, 4 pages.

Extended European Search Report issued Dec. 9, 2021 in European Patent Application No. 19834128.1, 11 pages.

International Search Report issued on Oct. 1, 2019 in PCT/JP2019/025418 filed on Jun. 26, 2019, 2 pages.

European Office Action issued Feb. 8, 2023 in European Patent Application No. 19 834 128.1, 4 pages.

Partial Supplementary European Search Report issued Aug. 26, 2021 in European Patent Application No. 19834128.1, 11 pages.

Huang Shiqiang., et al., "Adhesives and Their Applications", China Machine Press, Dec. 2011, 6 pages (with English translation).

Li Hejun et al., "Advanced Composite Materials Science", Northwestern Polytechnical University Press, Dec. 2016, (with English translation) 6 pages.

* cited by examiner

FIBER-REINFORCED RESIN COMPOSITE BODY, PRODUCTION METHOD THEREFOR, AND NON-WOVEN FABRIC FOR USE IN FIBER-REINFORCED RESIN COMPOSITE BODY

CROSS-REFERENCE TO RELATED APPLICATIONS

The present application is the national stage of international application PCT/JP2019/025418, filed on Jun. 26, 2019, and claims the benefit of the filing date of Japanese Appl. No. 2018-133420, filed on Jul. 13, 2018.

TECHNICAL FIELD

The present invention relates to a fiber-reinforced resin composite body having excellent impact resistance, a method for producing the fiber-reinforced resin composite body, and a non-woven fabric for use in the fiber-reinforced resin composite body.

BACKGROUND ART

Fiber-reinforced resin composite bodies, which are lighter than metals such as iron and aluminum and have high specific strength and high specific rigidity, have recently begun to be applied to applications such as aerospace fields, automobiles, sporting goods, and personal computer housings.

Examples of the method for producing such a fiber-reinforced resin composite body include a method in which a plurality of prepregs (sheet-shaped intermediate materials in which a reinforcing fiber such as a carbon fiber or an aramid fiber is impregnated with an uncured matrix resin) are stacked and then heat-cured.

From the viewpoints of heat resistance and productivity, thermosetting resins such as epoxy resins are used as a typical matrix resin used in such a prepreg. The thermosetting resins such as epoxy resins are excellent in heat resistance and adhesiveness to a reinforcing fiber, but are hard and brittle. Therefore, the fiber-reinforced resin composite body in which an epoxy resin is used as a matrix resin has a problem that the impact resistance is reduced.

In order to improve the impact resistance of the thermosetting resin as a matrix resin, a fiber-reinforced resin composite body has been proposed in which a thermoplastic resin such as polyetherimide is dispersed in a thermosetting resin to improve the impact resistance. For example, a fiber-reinforced resin composite body containing a resin soluble thermoplastic fiber has been proposed in which the thermoplastic resin is dissolved in a thermosetting resin at a temperature lower than the gelation/curing temperature of the thermosetting resin (see, for example, Patent Document 1). Furthermore, a carbon fiber-reinforced substrate including a fabric formed using a continuous carbon fiber and a thermoplastic resin such as an epoxy resin or a polyamide resin has been proposed in which the thermoplastic resin is unevenly distributed on and adhered to the surface of the fabric (see, for example, Patent Document 2).

CITATION LIST

Patent Document

Patent Document 1: Japanese Unexamined Patent Publication (Japanese Translation of PCT Application) No. 2008-540766

Patent Document 2: Japanese Unexamined Patent Publication No. 2003-82117

SUMMARY OF THE INVENTION

Technical Problem

However, in the fiber-reinforced resin composite body described in Patent Document 1, the thermoplastic fiber dissolves in the thermosetting resin during injection of the thermosetting resin, therefore, when the injected thermosetting resin flows, the dissolved thermoplastic resin is sometimes non-uniform, and the orientation of the reinforcing fiber is sometimes disturbed. As a result, a trouble has been caused that the impact resistance of the fiber-reinforced resin composite body is difficult to improve.

In the carbon fiber-reinforced substrate described in Patent Document 2, the thermoplastic resin present on the surface of the fabric is unevenly and discontinuously distributed, therefore, in the fiber-reinforced resin composite body obtained by impregnating the substrate with the thermosetting resin, flow of the thermoplastic resin during injection of the thermosetting resin sometimes causes non-uniformity of the thermoplastic resin, or the thermoplastic resin present on the surface of the fabric sometimes falls off. As a result, a trouble has been caused that the impact resistance of the fiber-reinforced resin composite body is difficult to improve.

The present invention has been made in view of the above-described problems, and an object of the present invention is to provide a fiber-reinforced resin composite body having excellent impact resistance and a non-woven fabric capable of improving the impact resistance of the fiber-reinforced resin composite body.

Solution to the Problem

The present inventors have conducted intensive studies to solve the above-described problems and have completed the present invention. Specifically, the present invention provides the following suitable aspects.

[1] A fiber-reinforced resin composite body including: a thermosetting resin; a plurality of reinforcing fiber layers stacked in the thermosetting resin; and a thermoplastic resin dispersed in a form of particles in the thermosetting resin between the plurality of reinforcing fiber layers.

[2] The fiber-reinforced resin composite body of the item [1], wherein the thermosetting resin is an epoxy resin derived from bisphenol A-diglycidyl ether represented by a formula shown below.

[Chemical Formula 1]

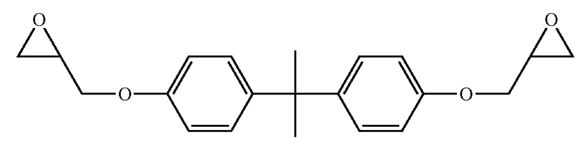

[3] The fiber-reinforced resin composite body of the item [1] or [2], wherein the fiber-reinforced resin composite body has a compression-after-impact strength of 150 MPa or more.

[4] The fiber-reinforced resin composite body of any one of the items [1] to [3], wherein the fiber-reinforced resin composite body has a bending strength of 800 MPa or more and a flexural modulus of 40 GPa or more under an absolutely dry condition.

[5] The fiber-reinforced resin composite body of any one of the items [1] to [4], wherein the fiber-reinforced resin composite body has a water absorption rate of 2.5% or less.

[6] The fiber-reinforced resin composite body of any one of the items [1] to [5], wherein the thermoplastic resin is at least one selected from the group consisting of polyetherimide resins, polysulfone resins, and polyethersulfone resins.

[7] The fiber-reinforced resin composite body of any one of the items [1] to [6], wherein the thermoplastic resin has a rate of a number of particles having a major axis of 3 μm or less to a total number of particles including the thermoplastic resin, the rate being 80% or more.

[8] A method for producing the fiber-reinforced resin composite body of any one of the items [1] to [7], the method including: a stacking step of stacking a non-woven fabric including a thermoplastic fiber between at least two layers of fabric including a reinforcing fiber to obtain a reinforcing fiber substrate; an impregnating step of impregnating the reinforcing fiber substrate with a thermosetting resin; and a heating and curing step of heating the reinforcing fiber substrate impregnated with the thermosetting resin to melt the non-woven fabric including the thermoplastic resin and cure the thermosetting resin.

[9] A non-woven fabric for use in a fiber-reinforced resin composite body, the non-woven fabric including a thermoplastic fiber to be inserted as a third component between reinforcing fiber layers in a fiber-reinforced resin composite body including a thermosetting resin and including a reinforcing fiber, the non-woven fabric having a basis weight of from 3 $g/m^2$ to 100 $g/m^2$, and an air permeability of from 10 $cc/cm^2/sec$ to 500 $cc/cm^2/sec$.

[10] The non-woven fabric for use in a fiber-reinforced resin composite body of the item [9], wherein in an epoxy resin derived from a bisphenol A-diglycidyl ether skeleton represented by a formula below, the thermoplastic fiber keeps a fiber shape at a temperature of less than 130° C. and dissolves in the epoxy resin at a temperature of 130° C. or more.

[Chemical Formula 2]

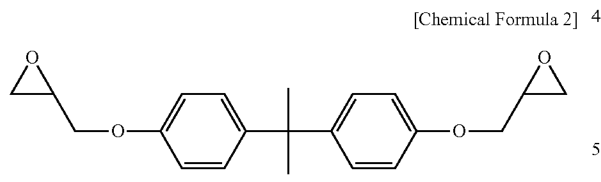

[11] The non-woven fabric for use in a fiber-reinforced resin composite body of the item [9] or [10], wherein the thermoplastic fiber has an average fiber diameter of from 1 μm to 10 μm.

[12] The non-woven fabric for use in a fiber-reinforced resin composite body of any one of the items [9] to [11], wherein the thermoplastic fiber is formed using at least one selected from the group consisting of polyetherimide resins, polysulfone resins, and polyethersulfone resins.

Advantages of the Invention

According to the present invention, it is possible to obtain a fiber-reinforced resin composite body having excellent impact resistance.

DETAILED DESCRIPTION

Hereinafter, an embodiment of the present invention will be described in detail, with reference to the drawings. Note that the present invention is not limited to the embodiment below.

Figure 1:
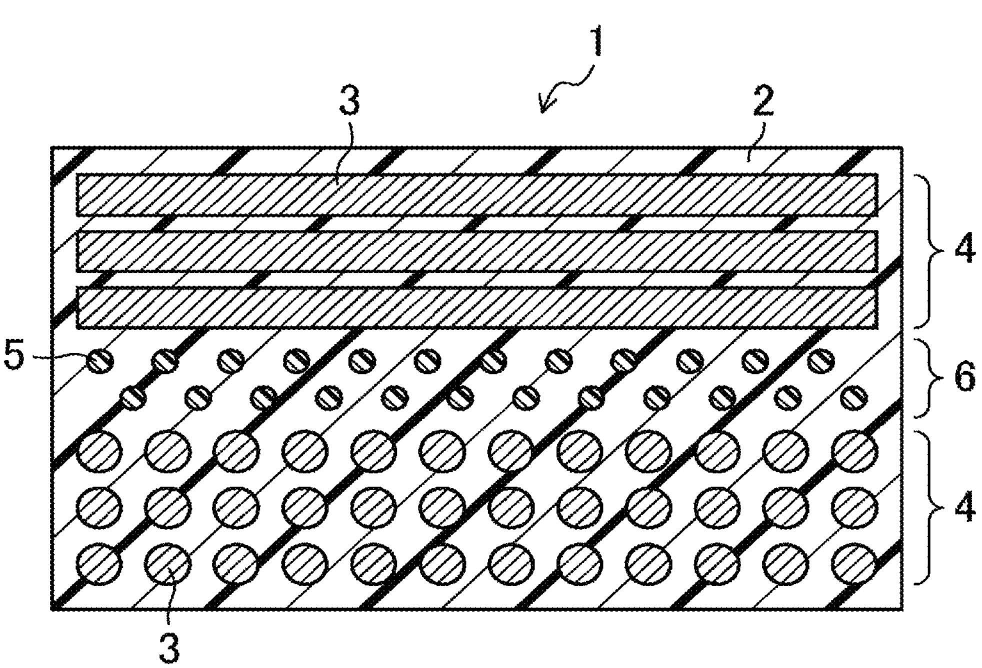
FIG. 1 is a cross-sectional view showing a fiber-reinforced resin composite body according to an embodiment of the present invention.

FIG. 1 is a cross-sectional view showing a fiber-reinforced resin composite body (hereinafter, sometimes simply referred to as "composite body") according to an embodiment of the present invention.

The fiber-reinforced resin composite body 1 of the present invention includes a thermosetting resin 2 that is a matrix resin, a plurality of (two, in the present embodiment) reinforcing fiber layers 4 including a reinforcing fiber 3, and a resin layer 6 provided between the two reinforcing fiber layers 4.

In the fiber-reinforced resin composite body 1 of the present invention, as shown in FIG. 1, the resin layer 6 existing between the plurality of reinforcing fiber layers 4 includes the thermosetting resin 2 and a thermoplastic resin 5 dispersed in a form of particles in the thermosetting resin 2. More specifically, the fiber-reinforced resin composite body 1 has the resin layer 6 including the thermosetting resin 2 and the thermoplastic resin 5 between the plurality of reinforcing fiber layers 4, and the resin layer 6 has a sea-island structure that includes a sea part including the thermosetting resin 2 and includes an island part including the thermoplastic resin 5.

The size of the island part including the thermoplastic resin 5 is not particularly limited, and for example, the rate of the number of particles having a major axis of 3 μm or less to the total number of particles including the thermoplastic resin 5 may be 80% or more. In one preferred embodiment, the rate is 82% or more, and in one more preferred embodiment, 85% or more. If the rate of the number of particles having a particle diameter of 3 μm or less along the major axis is within the above-described range, the impact resistance of the fiber-reinforced resin composite body 1 can be further improved.

A composite body obtained by impregnating a conventional laminate, in which only reinforcing fiber layers are stacked, with a thermosetting resin has a problem that delamination between the reinforcing fiber layers is likely to occur because the impact resistance between the reinforcing fiber layers is so low that the impact applied to the composite body propagates in the laminate in the in-plane direction.

Meanwhile, in the fiber-reinforced resin composite body 1 of the present invention, as shown in FIG. 1, the thermoplastic resin 5 is dispersed in a form of particles in the thermosetting resin 2 to form the resin layer 6, therefore, even when impact is applied to the fiber-reinforced resin composite body 1, the thermoplastic resin 5 having higher toughness than the thermosetting resin 2 reduces the propagation of the impact. As a result, the impact resistance of the fiber-reinforced resin composite body 1 can be improved.

(Reinforcing Fiber)

The reinforcing fiber 3 of the present invention is not particularly limited, and examples of the reinforcing fiber 3 include inorganic fibers such as carbon fibers, glass fibers, silicon carbide fibers, alumina fibers, ceramic fibers, basalt fibers, and various metal fibers (such as gold, silver, copper, iron, nickel, titanium, and stainless steel) and organic fibers such as all-aromatic polyester-based fibers, polyphenylene sulfide fibers, aramid fibers, polysulfonamide fibers, phenol resin fibers, polyimide fibers, and fluorine fibers. These fibers may be used singly, or in combination of two or more kinds thereof.

Among these reinforcing fibers 3, carbon fibers, glass fibers, all-aromatic polyester-based fibers, aramid fibers, ceramic fibers, and metal fibers are suitably used from the viewpoints of a mechanical property, flame retardancy, heat resistance, and availability.

(Thermoplastic Resin)

The thermoplastic resin 5 included in the fiber-reinforced resin composite body 1 of the present invention is obtained by dissolving a thermoplastic fiber 8 (that is, a fiber including a thermoplastic resin) described below. The molecular weight distribution of the thermoplastic resin 5 is not particularly limited. In one preferred embodiment, the molecular weight distribution represented by the ratio of the weight average molecular weight (Mw) to the number average molecular weight (Mn) (Mw/Mn) is 2.3 or less from the viewpoint of achieving the moldability and the uniformity of the mechanical property in the obtained fiber-reinforced resin composite body 1. In the case that the molecular weight distribution is more than 2.3, the solubility of the thermoplastic resin 5 is uneven in the curing step of the thermosetting resin 2 to cause unevenness in molding, and as a result, variation is sometimes caused in the appearance and the mechanical property of the obtained fiber-reinforced resin composite body 1. The weight average molecular weight (Mw), the number average molecular weight (Mn), and the molecular weight distribution can be calculated in terms of polystyrene by, for example, gel permeation chromatography (GPC), which is a kind of size exclusion chromatography (SEC).

The kind of the thermoplastic resin 5 is not particularly limited, and examples of the thermoplastic resin 5 include polyetherimide resins, polyetherketoneketone resins, thermoplastic polyimide resins, semi-aromatic polyamide resins, polyetheretherketone resins, polyphenylene sulfide resins, polysulfone resins, polyethersulfone resins, and polycarbonate resins. In one preferred embodiment particularly in the field of transportation equipment such as aerospace, automobiles, and ships, which require high heat resistance and water resistance, polyetherimide resins, polysulfone resins, and polyethersulfone resins are used because they are excellent in these properties, and among these resins, polyetherimide resins can be further suitably used. These resins may be used singly, or in combination of two or more kinds of these resins.

(Thermoplastic Fiber)

The kind of the thermoplastic fiber 8 used for forming the thermoplastic resin 5 included in the fiber-reinforced resin composite body 1 of the present invention is not particularly limited, and examples of the thermoplastic fiber 8 include polyetherimide-based fibers, polyetherketoneketone-based fibers, thermoplastic polyimide-based fibers, semi-aromatic polyamide-based fibers, polyetheretherketone-based fibers, polyphenylene sulfide-based fibers, polysulfone-based fibers, polyethersulfone-based fibers, and polycarbonate-based fibers. In one preferred embodiment particularly in the field of transportation equipment such as aerospace, automobiles, and ships, which require high heat resistance and water resistance, polyetherimide-based fibers, polysulfone-based fibers, and polyethersulfone-based fibers are used because they are excellent in these properties, and among these fibers, polyetherimide-based fibers are used in one more preferred embodiment. These fibers may be used singly, or in combination of two or more kinds of resins.

The structure of the resin included in the polyetherimide-based fiber is not particularly limited. In one preferred embodiment, the resin included in the fiber is the polyetherimide resin including, as a repeating unit, an aliphatic, alicyclic, or aromatic ether unit represented by the general formula described below and a cyclic imide, and having amorphousness, melt moldability, and a glass transition temperature of 200° C. or more from the viewpoints of flame retardancy and heat resistance.

[Chemical Formula 3]

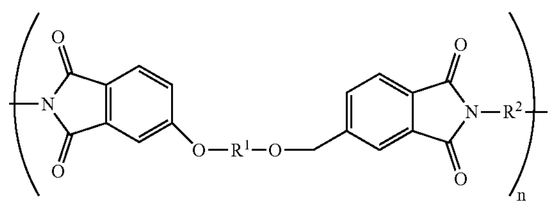

(In the above-described formula, $R^1$ represents a divalent aromatic residue having 6 to 30 carbon atoms, and $R^2$ represents a divalent organic group selected from the group consisting of divalent aromatic residues having 6 to 30 carbon atoms, alkylene groups having 2 to 20 carbon atoms, cycloalkylene groups having 2 to 20 carbon atoms, and polydiorganosiloxane groups chain-terminated with an alkylene group having 2 to 20 carbon atoms.)

More specifically, in one more preferred embodiment, a condensate of 2,2-bis[4-(2,3-dicarboxyphenoxy)phenyl]propane dianhydride and m-phenylenediamine, having a main structural unit represented by the formula described below is used as the resin included in the polyetherimide-based fiber from the viewpoints of amorphousness, melt moldability, and cost. Such a polyetherimide resin is commercially available from SABIC Innovative Plastics IP BV under the trademark “ULTEM”.

[Chemical Formula 4]

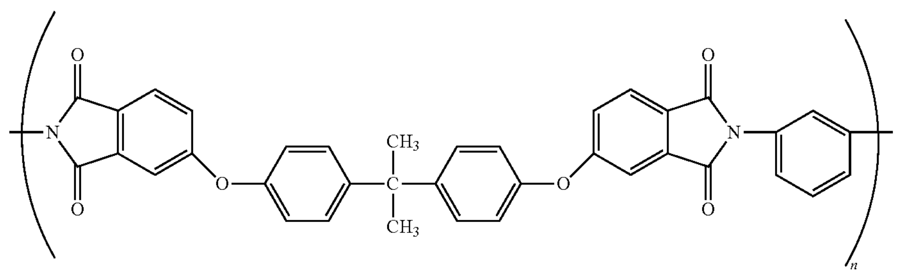

The structure of the resin included in the polyimide-based fiber is not particularly limited. In one preferred embodiment, a polyimide resin is included that has a repeating unit represented by the formula described below and includes from 99.9% by weight to 50% by weight of a thermoplastic polyimide and from 0.1% by weight to 50% by weight of an aromatic polyetherimide from the viewpoints of flame retardancy and heat resistance. As such a polyimide resin, for example, the resin disclosed in Japanese Unexamined Patent Publication No. H3-199234 can be used as shown in the following chemical formula.

[Chemical Formula 5]

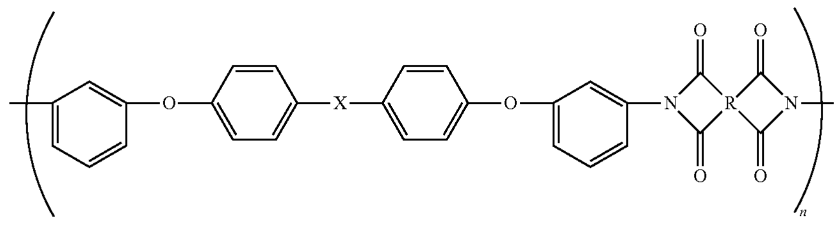

(In the above-described formula, X represents a group selected from the group consisting of a direct connection, divalent hydrocarbon groups having 1 to 10 carbon atoms, a hexafluoride isopropylidene group, a carbonyl group, a thio group, and a sulfonyl group, and R represents a tetravalent group selected from the group consisting of aliphatic groups having 2 or more carbon atoms, alicyclic groups, monocyclic aromatic groups, condensed polycyclic aromatic groups, and non-condensed polycyclic aromatic groups in which aromatic groups are connected to each other directly or via a bridging member.)

The thermoplastic fiber 8 used in the present invention may contain an antioxidant, an antistatic agent, a radical inhibitor, a matting agent, an ultraviolet absorber, a flame retardant, an inorganic substance, or the like as long as an effect of the present invention is not impaired. Specific examples of such an inorganic substance include carbon black, graphite, carbon nanotubes, fullerenes, silica, glass beads, glass flakes, glass powders, ceramic beads, boron nitride, silicon carbide, silicates (such as talc, wollastonite, zeolites, sericite, mica, kaolin, clay, pyrophyllite, bentonite, and alumina silicate), metal oxides (such as magnesium oxide, alumina, zirconium oxide, titanium oxide, and iron oxide), carbonates (such as calcium carbonate, magnesium carbonate, and dolomite), sulfates (such as calcium sulfate and barium sulfate), and hydroxides (such as calcium hydroxide, magnesium hydroxide, and aluminum hydroxide).

(Non-Woven Fabric for Use in Fiber-Reinforced Resin Composite Body Including Thermoplastic Fiber)

The method for producing the non-woven fabric for use in a fiber-reinforced resin composite body (hereinafter, sometimes abbreviated as "non-woven fabric" simply) 9 used in the present invention that includes the thermoplastic fiber 8 is not particularly limited, and a known method can be used. Examples of the method include a melt-blown method, a spun lace method, a needle punch method, a steam jet method, a dry papermaking method, and a wet papermaking method.

The non-woven fabric 9 used in the present invention may contain a water-soluble polymer fiber such as a polyvinyl alcohol-based fiber, a heat-fusible fiber such as a polyethylene terephthalate-based fiber, a pulp-like material of a para-based aramid fiber or an all-aromatic polyester-based fiber, or the like. In order to enhance the uniformity and the press-bonding property of the non-woven fabric, a binder may be applied by spray drying, or a hot pressing step may be added.

In one preferred embodiment, among the above-described methods, the melt-blown method is used as the method for producing the non-woven fabric 9 including the thermoplastic fiber 8 from the viewpoints that the small fineness can be relatively easily achieved, no solvent is needed during spinning, and the impact on the environment can be minimized. A known melt-blown device can be used as the spinning device, and in one preferred embodiment, the spinning is performed under the conditions of a spinning temperature of from 350° C. to 440° C., a hot air temperature (primary air temperature) of from 360° C. to 450° C., and an amount of air per 1 m of nozzle length of from 5 $Nm^3$/min to 50 $Nm^3$/min.

In one preferred embodiment, the thermoplastic fiber 8 included in the non-woven fabric 9 obtained as described above has an average fiber diameter of from 1 μm to 10 μm. If the average fiber diameter of the fiber included in the non-woven fabric is less than 1 μm, a fluff is sometimes generated, or a web is sometimes difficult to form. If the average fiber diameter is more than 10 μm, the denseness is reduced, and there is a possibility of reducing the reinforcing fiber volume rate in the obtained fiber-reinforced resin composite body. In one preferred embodiment, the non-woven fabric 9 including the thermoplastic fiber 8 in a reinforcing fiber substrate 10 as a precursor has a uniform basis weight and a uniform thickness in order to obtain a fiber-reinforced resin composite body having an excellent mechanical property and uniform quality. The smaller the average fiber diameter is, the larger the number of the thermoplastic fibers 8 included in the non-woven fabric 9 is, and the uniform non-woven fabric 9 can be obtained. However, if the average fiber diameter is less than 1 μm, there is a possibility that a trouble such as an entanglement will be caused in the process of producing the non-woven fabric 9, and that a non-woven fabric having uniform quality will not be obtained. Meanwhile, if the average fiber diameter is more than 10 μm, there is a possibility that the number of the thermoplastic fibers 8 included in the non-woven fabric 9 is too small to obtain a uniform non-woven fabric. In one more preferred embodiment, the average fiber diameter of the thermoplastic fiber 8 is from 1.2 μm to 9.5 μm, and in one still more preferred embodiment, from 1.5 μm to 9 μm.

In one preferred embodiment, the non-woven fabric 9 has a thickness of from 5 μm to 900 μm. Because the non-woven fabric 9 used in the present invention is dense, its thickness can be as small as within the range of from 5 μm to 900 μm while the strength is maintained. If the thickness of the non-woven fabric 9 is less than 5 μm, the strength is reduced, and there is a possibility of breakage during processing. If the thickness is more than 900 μm, the fusion between the fibers is weak, and there is a possibility that a web will be difficult to form. In one more preferred embodiment, the non-woven fabric 9 has a thickness of from 8 μm to 800 μm, and in one still more preferred embodiment, from 10 μm to 500 μm. In one preferred embodiment, the non-woven fabric 9 has a basis weight of from 3 $g/m^2$ to 100 $g/m^2$. If the basis weight of the non-woven fabric 9 is less than 3 $g/m^2$, the strength is reduced, and there is a possibility of breakage during processing. If the basis weight of the non-woven fabric is more than 100 $g/m^2$, there is a possibility of reducing the reinforcing fiber volume rate in the obtained fiber-reinforced resin composite body. In one more preferred embodiment, the basis weight of the non-woven fabric 9 is from 4 $g/m^2$ to 95 $g/m^2$, and in one still more preferred embodiment, from 5 $g/m^2$ to 90 $g/m^2$.

The term "basis weight" here refers to a value measured in accordance with JIS L1913 "Test methods for nonwovens".

From the above-described viewpoints, the non-woven fabric 9 including the thermoplastic fiber 8 of the present invention has an air permeability in the range of from 10 $cc/cm^2/sec$ to 500 $cc/cm^2/sec$. In one preferred embodiment, the air permeability is in the range of from 30 $cc/cm^2/sec$ to 450 $cc/cm^2/sec$, and in one more preferred embodiment, in the range of from 50 $cc/cm^2/sec$ to 400 $cc/cm^2/sec$. If the air permeability is less than 10 $cc/cm^2/sec$, the permeability in the resin impregnating step is reduced, and there is a possibility of deterioration of the physical property of the obtained fiber-reinforced resin composite body. If the air permeability is more than 500 $cc/cm^2/sec$, the shape of the non-woven fabric is unstable, and there is a possibility of reduction in the operability.

The term "air permeability" here refers a value measured in accordance with the specification of the Frazir method in JIS L1913 "Test methods for nonwovens".

Furthermore, in one preferred embodiment, the non-woven fabric 9 including the thermoplastic fiber 8 of the present invention has a bulk density of from 0.01 $g/cm^3$ to 1.0 $g/cm^3$. If the bulk density is less than 0.01 $g/cm^3$, the non-woven fabric is bulky, and therefore, there is a possibility that a trouble such as reduction in the operability during molding or a hole or tear in the non-woven fabric will be caused. If the bulk density is more than 1.0 $g/cm^3$, the non-woven fabric is almost plate-shaped, and there is a possibility that shaping will be difficult.

The cross-sectional shape of the thermoplastic fiber used in the present invention is not particularly limited, and the cross section may have a circular, hollow, or flat shape, or may be a modified cross section such as a star-shaped cross section. The thermoplastic fiber used here may be used in a form of, for example, a shortcut fiber or a staple fiber, and an appropriate fiber form can be freely selected in the production of the non-woven fabric.

(Thermosetting Resin)

The thermosetting resin used in the present invention is not particularly limited as long as it is conventionally used in a fiber-reinforced resin composite body, and examples of the thermosetting resin include epoxy resins, vinyl ester resins, phenol resins, unsaturated polyester resins, cyanate ester resins, bismaleimide resins, and benzoxazine resins. Among these resins, the epoxy resins can be suitably used from the viewpoints of heat resistance, a mechanical property, and dimensional stability. These resins may be used singly, or in combination of two or more kinds of these resins.

In one preferred embodiment, as the epoxy resin, an epoxy resin derived from a bisphenol A-diglycidyl ether skeleton represented by the formula described below is used from the viewpoints of heat resistance and a mechanical property. Such an epoxy resin is commercially available from Hexcel Corporation.

[Chemical Formula 6]

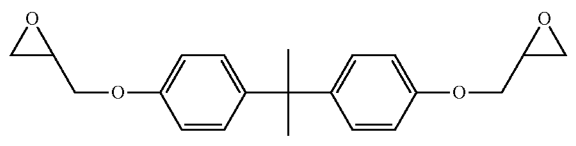

(Method for Producing Fiber-Reinforced Resin Composite Body)

Figure 2:
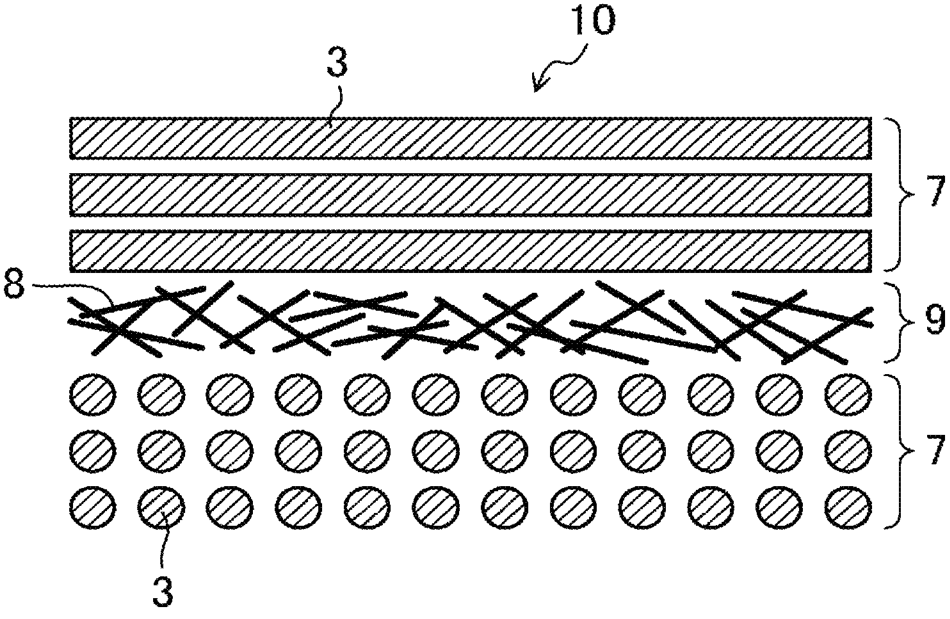
FIG. 2 is a cross-sectional view for illustrating a process of producing a fiber-reinforced resin composite body according to an embodiment of the present invention.
Figure 3:
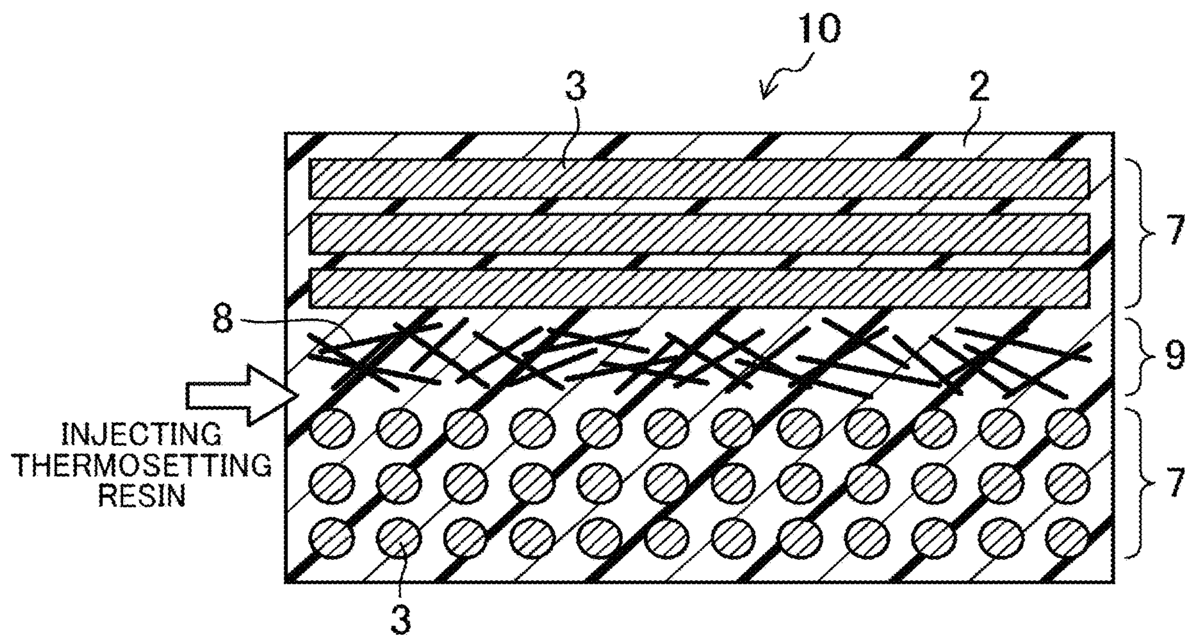
FIG. 3 is a cross-sectional view for illustrating a process of producing a fiber-reinforced resin composite body according to an embodiment of the present invention.

Next, an example of the method for producing the fiber-reinforced resin composite body of the present invention will be described. FIGS. 2 and 3 are cross-sectional views for illustrating a method for producing the fiber-reinforced resin composite body of the present invention.

Examples of the method for producing the fiber-reinforced resin composite body of the present invention include a method including: a stacking step of stacking a non-woven fabric including a thermoplastic fiber between at least two layers of fabric including a reinforcing fiber to obtain a reinforcing fiber substrate; an impregnating step of impregnating the reinforcing fiber substrate with a thermosetting resin; and a heating and curing step of heating the reinforcing fiber substrate impregnated with the thermosetting resin to melt the non-woven fabric including the thermoplastic resin and cure the thermosetting resin. Hereinafter, each step will be described.

<Stacking Step>

When the fiber-reinforced resin composite body 1 is produced, first, as shown in FIG. 2, the non-woven fabric 9 including the thermoplastic fiber 8 is stacked with a fabric 7 having at least one form selected from the group consisting of forms of a woven fabric, a knitted fabric, and an aligned yarn sheet-shaped material that include the reinforcing fiber 3 (that is, the non-woven fabric 9 including the thermoplastic fiber 8 is inserted as a third component between the fabrics 7) to prepare the reinforcing fiber substrate 10 including the fabric 7 and the non-woven fabric 9. If necessary, the reinforcing fiber substrate 10 may be hot-pressed.

For example, two fabrics 7 are prepared, and as shown in FIG. 2, the fabrics 7 are stacked so that the reinforcing fiber 3 in one fabric 7 is orthogonal to the reinforcing fiber 3 in the other fabric 7, the non-woven fabric 9 is stacked between the fabrics 7, and the resulting laminate is hot-pressed to prepare the reinforcing fiber substrate 10.

The number of the stacked fabrics 7 including the reinforcing fiber 3 and the number of the non-woven fabric 9 including the thermoplastic fiber 8 can be appropriately changed. Furthermore, the fabrics 7 may be stacked so that the reinforcing fibers 3 in the fabrics 7 are in the same direction, or the fabrics 7 may be stacked so that the reinforcing fiber 3 in each fabric 7 is in an arbitrary direction.

(Fabric Including Reinforcing Fiber)

Examples of the fabric 7 including the reinforcing fiber 3 include woven fabrics, knitted fabrics, non-woven fabrics, and UD sheets (Unidirectional: a form in which fibers are aligned in one direction). In one preferred embodiment, among these fabrics, the fabrics including a continuous fiber, such as the woven fabrics, the knitted fabrics, and the UD sheets are used from the viewpoint of the mechanical property of the composite body.

<Impregnating Step>

Next, as shown in FIG. 3, the thermosetting resin 2 that is a liquid matrix resin is injected to impregnate the reinforcing fiber substrate 10 with the thermosetting resin 2.

<Heating and Curing Step>

Next, the thermosetting resin 2 is cured by heating the reinforcing fiber substrate 10 impregnated with the thermosetting resin 2 to the curing temperature of the thermosetting resin 2 at a predetermined temperature rise rate.

At this time, first, the non-woven fabric 9 including the thermoplastic fiber 8 dissolves in the thermosetting resin 2 in a high temperature state and becomes the thermoplastic resin 5 before reaching the temperature at which the thermosetting resin 2 starts to cure. Next, progress of the heat curing of the thermosetting resin 2 causes the phase separation of the thermoplastic resin 5, and the resin layer 6 having a sea-island structure that includes a sea part including the thermosetting resin 2 and includes an island part including the thermoplastic resin 5 (that is, the thermoplastic resin 5 in a form of particles is uniformly dispersed in the thermosetting resin 2) is formed to produce the fiber-reinforced resin composite body 1 shown in FIG. 1.

For example, in the case that an epoxy resin having the bisphenol A-diglycidyl ether skeleton is used as the thermosetting resin 2, the thermoplastic fiber 8 is used that keeps a fiber shape at a temperature of less than 130° C. in the epoxy resin and dissolves in the epoxy resin at a temperature of 130° C. or more. As a result, when the thermosetting resin 2 is heat-cured, the thermosetting resin 2 and the non-woven fabric 9 including the thermoplastic fiber 8 become compatible with each other, and then phase-separated to form the resin layer 6 in which the thermoplastic resin 5 (thermoplastic resin obtained by dissolving the non-woven fabric including the thermoplastic fiber 8) in a form of particles is uniformly dispersed in the thermosetting resin 2.

In the resin layer 6, the fact that the particles of the thermoplastic resin 5 are uniformly present in the thermosetting resin 2 of the fiber-reinforced resin composite body 1 leads to the exhibition of the impact resistance. Specifically, when impact is applied, the crack growth that reaches the particles of the thermoplastic resin 5 causes delamination at the interface between the thermoplastic resin 5 and the thermosetting resin 2, and the delamination absorbs the impact energy to reduce the crack growth. At this time, in one preferred embodiment, the thermoplastic resin 5 has a small particle diameter because the larger surface area the interface has, the larger impact energy the delamination absorbs.

(Fiber-Reinforced Resin Composite Body)

As described above, the fiber-reinforced resin composite body 1 of the present invention has excellent impact resistance. In one preferred embodiment, the compression-after-impact strength (CAI) measured in accordance with ASTM D7137 is 150 MPa or more. In one more preferred embodiment, the compression-after-impact strength is 160 MPa or more, and in one still more preferred embodiment, 170 MPa or more. The upper limit of the compression-after-impact strength (CAI) is not particularly limited, and is usually 500 MPa or less. In one preferred embodiment, the upper limit may be 400 MPa or less, and in one more preferred embodiment, about 300 MPa or less.

Furthermore, the fiber-reinforced resin composite body 1 of the present invention has excellent strength as described above. In one preferred embodiment, the bending strength and the flexural modulus under an absolutely dry condition (that is, a condition of a water content of 0%) are 800 MPa or more and 40 GPa or more, respectively. In one more preferred embodiment, the bending strength and the flexural modulus are 850 MPa or more and 45 GPa or more, respectively, and in one still more preferred embodiment, 900 MPa or more and 50 GPa or more, respectively. The upper limit of the bending strength under the absolutely dry condition is not particularly limited, and is usually 5,000 MPa or less. In one preferred embodiment, the upper limit may be 4,000 MPa or less, and in one more preferred embodiment, about 3,000 MPa or less. The upper limit of the flexural modulus under the absolutely dry condition is not particularly limited, and is usually 500 GPa or less. In one preferred embodiment, the upper limit may be 400 GPa or less, and in one more preferred embodiment, about 300 GPa or less.

Furthermore, in one preferred embodiment, the fiber-reinforced resin composite body 1 in a water absorbing state (a state in which a test piece is immersed in hot water at 70° C. for 14 days) has a bending strength and a flexural modulus of 800 MPa or more and 40 GPa or more, respectively. In one more preferred embodiment, the bending strength and the flexural modulus are 830 MPa or more and 43 GPa or more, respectively, and in one still more preferred embodiment, 850 MPa or more and 45 GPa or more, respectively. The upper limit of the bending strength in the water absorbing state is not particularly limited, and is usually 5,000 MPa or less. In one preferred embodiment, the upper limit may be 4,000 MPa or less, and in one more preferred embodiment, about 3,000 MPa or less. The upper limit of the flexural modulus in the water absorbing state is not particularly limited, and is usually 500 GPa or less. In one preferred embodiment, the upper limit may be 400 GPa or less, and in one more preferred embodiment, about 300 GPa or less.

The term "bending strength and flexural modulus" here refers to values measured in accordance with the specification of JIS K7017: 1999 "Fiber-reinforced plastics composites-Determination of flexural properties".

Furthermore, in one preferred embodiment, the fiber-reinforced resin composite body 1 of the present invention has a water absorption rate of 2.5% or less, and in one more preferred embodiment, the water absorption rate is 2.0% or less, and in one still more preferred embodiment, 1.5% or less from the viewpoint of keeping a physical property in a wet environment.

The term "water absorption rate" here refers to a value measured in accordance with JIS L1907 "water absorption rate".

Furthermore, in one preferred embodiment, the fiber-reinforced resin composite body 1 of the present invention has a porosity of 2.5% or less, and in one more preferred embodiment, the porosity is 2.0% or less, and in one still more preferred embodiment, 1.5% or less from the viewpoint of reducing the deterioration of the impact resistance due to a void in the resin layer 6.

The term "porosity" here refers to the volume rate of the resin-unimpregnated part in the fiber-reinforced resin composite body.

In one preferred embodiment, the composite body has a reinforcing fiber volume rate of from 40% to 80%. In one more preferred embodiment, the reinforcing fiber volume rate is from 42% to 75%, and in one still more preferred embodiment, from 44% to 70%. If the reinforcing fiber volume rate is less than the lower limit of the above-described range, there is a possibility that the mechanical property of the obtained fiber-reinforced resin composite body will be deteriorated. If the reinforcing fiber volume rate is more than the upper limit of the above-described range, there is a possibility that a void will be generated in the obtained fiber-reinforced resin composite body to deteriorate the mechanical property.

The fiber-reinforced resin composite body 1 of the present invention has excellent impact resistance, and therefore, is suitably used in, for example, housings for a household appliance or the like such as a personal computer, a display, office automation equipment, a mobile phone, a mobile information terminal, a digital video camera, an optical device, an audio device, an air conditioner, a lighting fixture, or a toy, electrical and electronic equipment parts such as trays, chassis, interior materials, and cases for an interior material, civil engineering and building parts such as columns, panels, and reinforcements, outer panels and body parts such as various members, various frames, various hinges, various arms, various axles, various wheel bearings, various beams, various pillars, various members, various frames, various beams, various supports, various rails, and various hinges, exterior parts such as bumpers, moldings, under covers, engine covers, fenders, spoilers, cowl louvers, and aero parts, interior parts such as instrument panels, seat frames, door trims, pillar trims, handles, and various modules, automobile and motorcycle structural parts such as motor parts, CNG tanks, gasoline tanks, fuel pumps, air intakes, intake manifolds, carburetor main bodies, carburetor spacers, various pipes, and parts for a fuel system, an exhaust system, or an intake system, such as various valves, and aircraft parts such as landing gear pods, winglets, spoilers, edges, rudders, elevators, fairings, and ribs.

EXAMPLES

The present invention is described below based on examples. Note that the present invention shall not be limited to these examples. These examples may be modified and changed based on the intent of the present invention. Such changes and modifications shall not be excluded from the scope of the invention.

The items such as the basis weight and the air permeability of the non-woven fabric were each measured by the method described below.

<Air Permeability of Non-Woven Fabric>

The air permeability was measured in accordance with the Frazir method in JIS L1913 "Test methods for nonwovens".

<Basis Weight of Non-Woven Fabric>

In accordance with JIS L1913, a sample piece having a length of 20 cm and a width of 20 cm was taken, the mass of the sample piece was measured with an electronic balance, and the mass was divided by the area of the test piece (0.04 $m^2$) to determine the mass per unit area as the basis weight.

<Basis Weight of Composite Body>

A composite body having a length of 35 cm and a width of 25 cm was prepared, and its weight was divided by the area of the composite body (0.0875 $m^2$) to determine the mass per unit area as the basis weight.

<Porosity>

The section of the polished composite body was photographed with a microscope (manufactured by KEYENCE CORPORATION, trade name: VHX-5000), and the area rate of the void part was calculated to determine the porosity. More specifically, the area of the void part and the area of the filled part were each calculated by binarizing the polished section, and the porosity was calculated by Formula (1) described below.

[Math. 1]

$$\text{Porosity (\%)} = \text{void part}/(\text{void part}+\text{filled part})\times 100 \quad (1)$$

<Fiber Volume Rate>

The section of the polished composite body was photographed with a microscope (manufactured by KEYENCE CORPORATION, trade name: VHX-5000), and the area rate of the carbon fiber was calculated to determine the porosity. More specifically, the area of the void part, the area of the resin part, and the area of the fiber part were each calculated by binarizing the polished section, and the fiber volume rate was calculated by Formula (2) described below.

[Math. 2]

$$\text{Fiber volume rate (\%)} = \text{fiber part}/(\text{fiber part}+\text{resin part})\times 100 \quad (2)$$

Example 1

<Preparation of Fiber-Reinforced Resin Composite Body>

On a metal drum, a carbon fiber (manufactured by Mitsubishi Rayon Co., Ltd., product name: TR50S12L) was wound while opened, and pressed with a roll while heated by an infrared heater to obtain a uni direction (UD) sheet in which the carbon fibers were aligned in only one direction. The basis weight of the obtained UD sheet was 200 $g/m^2$.

Next, 24 of the obtained UD sheets were prepared and stacked so that the carbon fiber in each UD sheet was arranged to be orthogonal to the carbon fiber in the adjacent UD sheet (that is, to be a cross-ply laminate).

Next, between the adjacent two UD sheets, one non-woven fabric including a polyetherimide fiber (a melt blown non-woven fabric, basis weight: 8 $g/m^2$, air permeability: 220 $cc/cm^2/sec$) was inserted, that is, 23 of the non-woven fabrics were inserted in total. Then, the obtained laminated sheet was hot-pressed at 180° C. and 1 MPa.

Next, this laminated sheet was put in a vacuum bag on a hot plate, the vacuum bag was evacuated of air, then the hot plate was kept warm at 120° C., and an epoxy resin (manufactured by Hexcel Corporation, trade name: RTM6-2) was injected into the laminated sheet while kept warm at 80° C. to impregnate the polyetherimide fiber with the epoxy resin. Then, the temperature of the hot plate was raised to 180° C. while the vacuum state was kept, and the temperature was kept for 2 hours. As a result, the curing of the epoxy resin was completed to prepare a fiber-reinforced resin composite body in which 24 of the UD sheets were stacked. The obtained fiber-reinforced resin composite body had a basis weight of 7,420 $g/m^2$, a thickness of 4.8 mm, a porosity of 1.5%, and a fiber volume rate of 56%.

Figure 4:
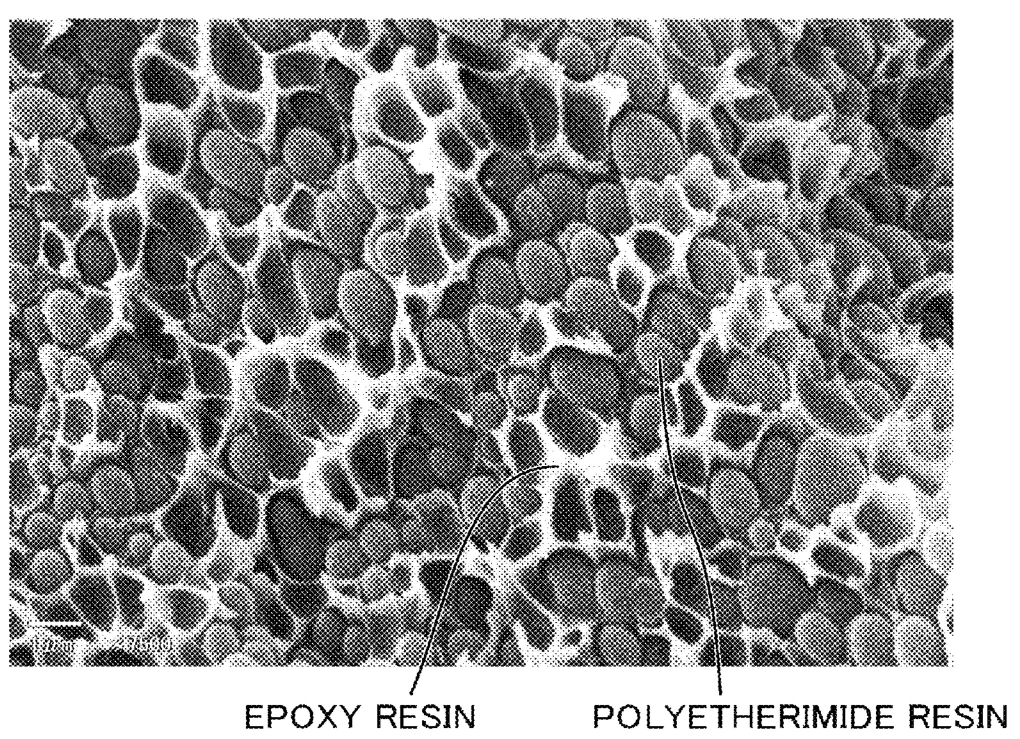
FIG. 4 is a scanning electron microscope (SEM) photograph of a resin layer in a fiber-reinforced resin composite body in Example 1 of the present invention.

Furthermore, a fiber-reinforced resin composite body in which 12 of the UD sheets were stacked was prepared in the same manner except that the number of the stacked UD sheets was 12 and the number of the non-woven fabrics including the polyetherimide fiber was 11. The obtained fiber-reinforced resin composite body had a basis weight of 3,710 $g/m^2$, a thickness of 2.4 mm, a porosity of 1.5%, and a fiber volume rate of 56%. The resin layer (layer including the epoxy resin and the polyetherimide resin) in this composite body was delaminated, and the resulting section was observed with a scanning electron microscope (SEM). FIG. 4 is the scanning electron microscope (SEM) photograph. It can be seen that, as shown in FIG. 4, the resin layer in the fiber-reinforced resin composite body has a sea-island structure that includes a sea part including the epoxy resin and includes an island part including the polyetherimide resin.

<Rate of Particles Having Major Axis of 3 μm or Less in Thermoplastic Resin Particles>

First, the total number of the particles including the thermoplastic resin was counted in the image corresponding to the section of 37.5 μm×28 μm square from the SEM image (3,500 times) of the section of the delamination of the resin layer in the fiber-reinforced resin composite body. Next, the major axis of each particle including the thermoplastic resin was measured in the same image, and the number of the particles having a major axis of 3 μm or less was counted. Then, the rate of the number of the particles having a major axis of 3 μm or less to the total number of the particles was calculated. Table 1 shows the results.

<Measurement of Compression-After-Impact Strength>

The impact resistance was evaluated in accordance with ASTM-D7137. More specifically, the falling weight impact was applied, to the composite body in which 24 of the UD sheets were stacked, by 6.67 J per 1 mm of thickness of the composite body, and then a compression test was performed to measure the compression-after-impact strength. Table 1 shows the results.

<Measurement of Water Absorption Rate>

The water absorption rate was measured in accordance with JIS L1907 "water absorption rate". More specifically, the composite body in which 12 of the UD sheets were stacked was cut into a strip having a size of 120 mm×25 mm, the weight of the strip in a state of being vacuum-dried at 80° C. for 24 hours (absolute dry weight) and the weight of the strip in a state of being immersed in hot water at 70° C. for 14 days and wiped to be free of water on the surface (water absorption weight) were measured, and the water absorption rate was calculated by Formula (3) described below. Table 1 shows the results.

[Math. 3]

$$\text{Water absorption rate (\%)}=\{(\text{water absorption weight}-\text{absolute dry weight})/\text{absolute dry weight}\}\times 100 \quad (3)$$

<Measurement of Bending Strength and Flexural Modulus>

The bending strength and the flexural modulus were measured in according with JIS K7017. More specifically, the composite body in which 12 of the UD sheets were stacked was cut into a strip having a size of 120 mm×25 mm, and the strip was vacuum-dried at 80° C. for 24 hours and then subjected to a bending test to measure the bending strength and the flexural modulus under the absolutely dry condition. Furthermore, a sample was subjected to measurement of the water absorption rate, and then to a bending test in the same manner as described above to measure the bending strength in the water absorbing state. Table 1 shows the results.

Example 2

A fiber-reinforced resin composite body was obtained in the same manner as in Example 1 except that a non-woven fabric having a basis weight of 15 $g/m^2$ and an air permeability of 110 $cc/cm^2/sec$ was used as the non-woven fabric including the polyetherimide fiber.

Then, in the same manner as in Example 1, the compression-after-impact strength, the water absorption rate, the bending strength, and the flexural modulus were measured. Table 1 shows the results.

Example 3

A fiber-reinforced resin composite body was obtained in the same manner as in Example 1 except that a non-woven fabric having a basis weight of 30 $g/m^2$ and an air permeability of 80 $cc/cm^2/sec$ was used as the non-woven fabric including the polyetherimide fiber.

Then, in the same manner as in Example 1, the compression-after-impact strength, the rate of the particles having a major axis of 3 μm or less, the water absorption rate, the bending strength, and the flexural modulus were measured. Table 1 shows the results.

Example 4

A fiber-reinforced resin composite body was obtained in the same manner as in Example 1 except that a non-woven fabric having a basis weight of 100 $g/m^2$ and an air permeability of 40 $cc/cm^2/sec$ was used as the non-woven fabric including the polyetherimide fiber.

Then, in the same manner as in Example 1, the compression-after-impact strength, the water absorption rate, the bending strength, and the flexural modulus were measured. Table 1 shows the results.

Comparative Example 1

A fiber-reinforced resin composite body was obtained in the same manner as in Example 1 except that the non-woven fabric including the polyetherimide fiber was not used.

Then, in the same manner as in Example 1, the compression-after-impact strength, the water absorption rate, the bending strength, and the flexural modulus were measured. Table 1 shows the results.

Figure 5:
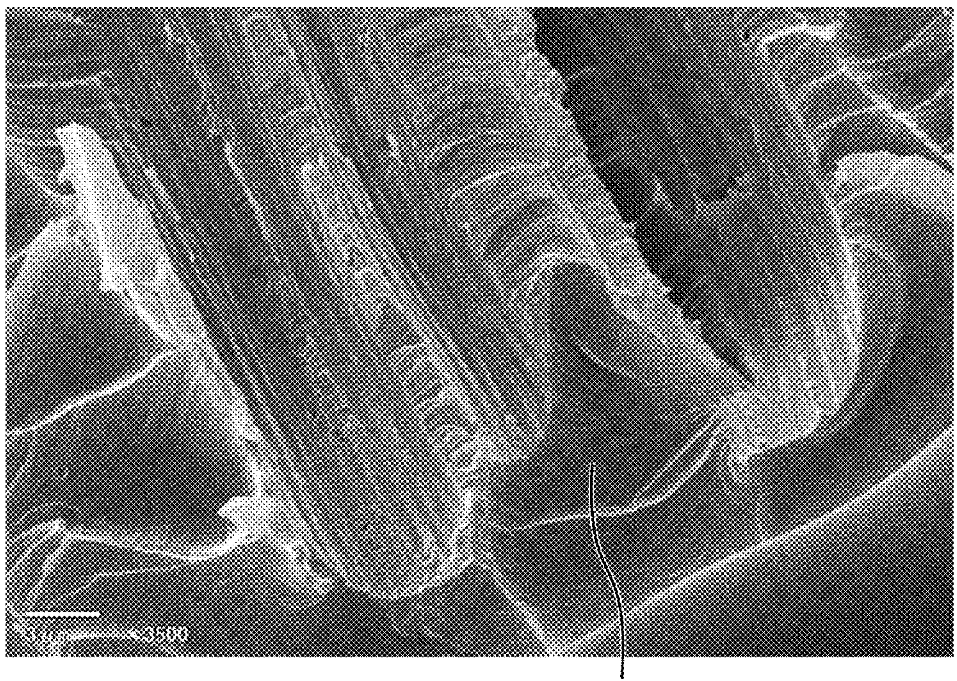
FIG. 5 is a scanning electron microscope (SEM) photograph of a resin layer in a fiber-reinforced resin composite body in Comparative Example 1 of the present invention.

Furthermore, the resin layer (layer including the epoxy resin) in the prepared fiber-reinforced resin composite body was delaminated, and the resulting section was observed with a scanning electron microscope (SEM). FIG. 5 is the scanning electron microscope (SEM) photograph. It can be seen that, as shown in FIG. 5, the resin layer in the fiber-reinforced resin composite body has no sea-island structure unlike the fiber-reinforced resin composite body in Example 1.

Comparative Example 2

A fiber-reinforced resin composite body was obtained in the same manner as in Example 1 except that a polyetherimide film (basis weight: 8 $g/m^2$, air permeability: 0 $cc/cm^2/sec$) was used instead of the non-woven fabric including the polyetherimide fiber.

Then, in the same manner as in Example 1, the compression-after-impact strength, the water absorption rate, the bending strength, and the flexural modulus were measured. Table 1 shows the results.

because in Examples 1 to 4, the impact resistance of the fiber-reinforced resin composite body is improved as follows. The fact that the non-woven fabric including the polyetherimide fiber, that is, the non-woven fabric inserted between the adjacent two UD sheets has a basis weight of from 3 $g/m^2$ to 100 $g/m^2$ and an air permeability of from 10 $cc/cm^2/sec$ to 500 $cc/cm^2/sec$ leads to, as described above, the improvement of the permeability of the epoxy resin into the polyetherimide fiber in the impregnating step, and furthermore, to the formation of the resin layer having a sea-island structure in which the polyetherimide resin in a form of particles is uniformly dispersed in the epoxy resin in the heating and curing step. Therefore, the polyetherimide resin having higher toughness than the epoxy resin reduces the propagation of the impact in the entire resin layer, and as a result, the impact resistance of the fiber-reinforced resin composite body is improved.

Furthermore, it can be seen that in the fiber-reinforced resin composite body in Examples 1 and 3 in which the rate of the number of the particles having a particle diameter of 3 μm or less along the major axis is 80% or more, the compression-after-impact strength value is particularly large, and the impact resistance can be further improved.

Meanwhile, in Comparative Example 1, it is considered that the impact resistance is not improved because the

| | | | | Example 1 | Example 2 | Example 3 | Example 4 | Comparative Example 1 | Comparative Example 2 |
|---|---|---|---|---|---|---|---|---|---|
| Substrate Composition | Thermoplastic Fiber | Kind of Resin | | Polyether-imide | Polyether-imide | Polyether-imide | Polyether-imide | None | Polyether-imide |
| | | Form | | Melt Blow | Melt Blow | Melt Blow | Melt Blow | — | Film |
| | | Basis Weight | $g/m^2$ | 8 | 15 | 30 | 100 | — | 8 |
| | | Air Permeability | $cc/cm^2 \cdot sec$ | 220 | 110 | 80 | 40 | — | 0 |
| | Thermosetting Resin | Kind of Resin | | Epoxy | Epoxy | Epoxy | Epoxy | Epoxy | Epoxy |
| | Reinforcing Fiber | Kind of Fiber | | Carbon Fiber | Carbon Fiber | Carbon Fiber | Carbon Fiber | Carbon Fiber | Carbon Fiber |
| | | Form | | UD Sheet | UD Sheet | UD Sheet | UD Sheet | UD Sheet | UD Sheet |
| | | Basis Weight | $g/m^2$ | 200 | 200 | 200 | 200 | 200 | 200 |
| | | Number of Stacked Sheets | | 24 | 24 | 24 | 24 | 24 | 24 |
| | | Method of Stacking | | Cross Ply | Cross Ply | Cross Ply | Cross Ply | Cross Ply | Cross Ply |
| Composite Body (24 Sheets Stacked) | | Basis Weight | $g/m^2$ | 7420 | 7450 | 7500 | 9000 | 7330 | 7290 |
| | | Thickness | mm | 4.8 | 4.9 | 5.0 | 6.0 | 4.8 | 5.1 |
| | | Porosity | % | 1.5 | 1.5 | 1.3 | 1.1 | 2.3 | 7.4 |
| | | Fiber Volume Rate | % | 56 | 54 | 52 | 44 | 57 | 53 |
| | | Rate of Particles Having Major Axis of 3 μm or Less | % | 87 | — | 99 | — | — | — |
| Evaluation Results | | Compression-after-impact Strength | MPa | 173 | 172 | 170 | 160 | 139 | 130 |
| Composite Body (12 Sheets Stacked) | | Basis Weight | $g/m^2$ | 3710 | 3720 | 3750 | 4500 | 3670 | 3650 |
| | | Thickness | mm | 2.4 | 2.4 | 2.5 | 3.0 | 2.4 | 2.5 |
| | | Porosity | % | 1.5 | 1.5 | 1.3 | 1.1 | 2.3 | 7.4 |
| | | Fiber Volume Rate | % | 56 | 54 | 52 | 44 | 57 | 53 |
| Evaluation Results | | Water Absorption Rate | % | 1.3 | 1.3 | 1.3 | 1.4 | 1.7 | 3.2 |
| | | Strength under Absolutely Dry Condition | MPa | 1200 | 1180 | 1150 | 960 | 1199 | 1030 |
| | | Flexural Modulus under Absolutely Dry Condition | GPa | 78 | 76 | 73 | 59 | 77.3 | 72 |
| | | Strength in Water Absorbing State | MPa | 1011 | 1010 | 1000 | 840 | 919 | 853 |

It can be seen that, as shown in Table 1, all the fiber-reinforced resin composite bodies in Examples 1 to 4 have a larger compression-after-impact strength value and more excellent impact resistance than the fiber-reinforced resin composite bodies in Comparative Examples 1 and 2. This is non-woven fabric including the polyetherimide fiber is not used. In Comparative Example 2, it is considered that the permeability of the epoxy resin is reduced because the polyetherimide film having no air permeability is used, then in the resin layer after curing the epoxy resin, a void (bubble)

is generated in the portion where the epoxy resin is prevented from passing, and the void causes the reduction in the compression-after-impact strength. In Comparative Example 2, the fact that the fiber-reinforced resin composite body has an extremely high porosity shows that a void is generated.

INDUSTRIAL APPLICABILITY

As described above, the present invention is suitable for a non-woven fabric including a thermoplastic resin, and a fiber-reinforced resin composite body in which the non-woven fabric is used.

DESCRIPTION OF REFERENCE CHARACTERS

1 Fiber-reinforced Resin Composite Body
2 Thermosetting Resin
3 Reinforcing Fiber
4 Reinforcing Fiber Layer
5 Thermoplastic Resin
6 Resin Layer
7 Fabric
8 Thermoplastic Fiber
9 Non-woven Fabric
10 Reinforcing Fiber Substrate

The invention claimed is:

1. A fiber-reinforced resin composite body, comprising:
- a thermosetting resin;
- a plurality of reinforcing fiber layers stacked in the thermosetting resin; and
- a thermoplastic resin dispersed in a form of particles in the thermosetting resin between the plurality of reinforcing fiber layers,
- wherein the thermoplastic resin has particles having a major axis of 3 μm or less in at least 80%, relative to a total number of particles in the thermoplastic resin,
- wherein the thermoplastic resin comprises a polyetherimide resin, a polysulfone resin, and/or a polyethersulfone resin, and
- wherein the thermoplastic resin is uniformly present in the thermosetting resin.

2. The body of claim 1, wherein the thermosetting resin is an epoxy resin derived from a bisphenol A-diglycidyl ether skeleton of formula:

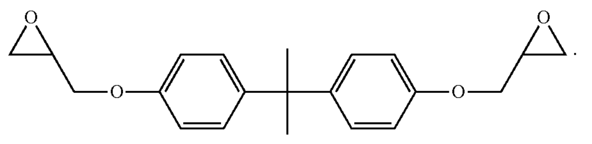 [SMILES: CC(C)(c1ccc(OCC2CO2)cc1)c1ccc(OCC2CO2)cc1]

3. The body of claim 1, having a compression-after-impact strength of 150 MPa or more.

4. The body of claim 1, having a bending strength of 800 MPa or more and a flexural modulus of 40 GPa or more under an absolutely dry condition.

5. The body of claim 1, having a water absorption rate of 2.5% or less.

6. The body of claim 1, wherein the thermoplastic resin comprises the polyetherimide resin.

7. The body of claim 1, wherein the thermoplastic resin comprises the polysulfone resin.

8. The body of claim 1, wherein the thermoplastic resin comprises the polyethersulfone resin.

9. The body of claim 1, wherein the reinforcing fiber layers comprise carbon fibers.

10. The body of claim 1, wherein the reinforcing fiber layers comprise glass fibers, all-aromatic polyester-based fibers, aramid fibers, ceramic fibers, or metal fibers.

11. The body of claim 1, having a compression-after-impact strength in a range of from 150 to 500 MPa.

12. The body of claim 1, wherein the thermoplastic resin comprises, as a main structural unit:

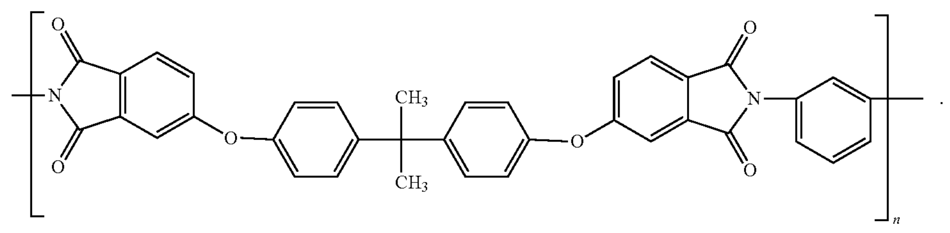

13. The body of claim 1, having a porosity of 2.0% or less.

14. The body of claim 1, having a porosity of 1.5% or less,
- wherein the thermosetting resin is an epoxy resin derived from a bisphenol A-diglycidyl ether skeleton of formula:

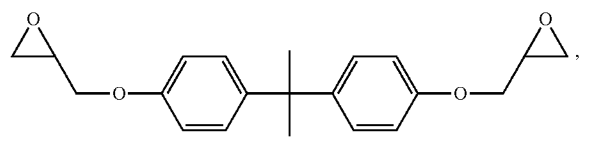 [SMILES: CC(C)(c1ccc(OCC2CO2)cc1)c1ccc(OCC2CO2)cc1]

and
- wherein the reinforcing fiber layers comprise carbon fibers, glass fibers, all-aromatic polyester-based fibers, aramid fibers, ceramic fibers, and/or metal fibers.

15. The body of claim 1, wherein the thermosetting resin and the thermoplastic resin form a sea-island structure.

16. A method for producing the fiber-reinforced resin composite body of claim 1, the method comprising:
- stacking a non-woven fabric comprising a thermoplastic fiber, comprising the thermoplastic resin, between at least two of the plurality of the reinforcing fiber layers to obtain a reinforcing fiber substrate;
- impregnating the reinforcing fiber substrate with the thermosetting resin; and
- heating the reinforcing fiber substrate impregnated with the thermosetting resin to melt the non-woven fabric comprising the thermoplastic resin and cure the thermosetting resin, thereby dispersing the thermoplastic resin in a form of particles having the major axis of 3

μm or less in at least 80% in the thermosetting resin between the plurality of reinforcing fiber layers.

* * * * *